(12) United States Patent  (10) Patent No.: US 10,922,228 B1
Wallace et al.  (45) Date of Patent: Feb. 16, 2021

(54) MULTIPLE LOCATION INDEX

(71) Applicant: EMC Corporation, Hopkinton, MA (US)

(72) Inventors: Grant R. Wallace, Pennington, NJ (US); Philip N. Shilane, Yardley, PA (US); Mahesh Kamat, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 15 days.

(21) Appl. No.: 14/674,911

(22) Filed: Mar. 31, 2015

(51) Int. Cl.
*G06F 12/0817* (2016.01)
*G06F 12/0831* (2016.01)
*G06F 3/06* (2006.01)

(52) U.S. Cl.
CPC ........ *G06F 12/0817* (2013.01); *G06F 3/0607* (2013.01); *G06F 3/0644* (2013.01); *G06F 3/0688* (2013.01); *G06F 12/0833* (2013.01); *G06F 2212/62* (2013.01); *G06F 2212/622* (2013.01)

(58) Field of Classification Search
CPC .. G06F 12/0817; G06F 3/0607; G06F 3/0688; G06F 3/0644; G06F 12/0833; G06F 2212/62; G06F 2212/622
See application file for complete search history.

(56) References Cited

U.S. PATENT DOCUMENTS

| | | | |
|---|---|---|---|
| 5,581,729 A | 12/1996 | Nishtala et al. | |
| 5,644,753 A | 7/1997 | Ebrahim et al. | |
| 6,018,763 A | 1/2000 | Hughes et al. | |
| 6,134,634 A | 10/2000 | Marshall et al. | |
| 6,295,582 B1 | 9/2001 | Spencer | |
| 6,516,386 B1 | 2/2003 | Pang et al. | |
| 6,772,298 B2 | 8/2004 | Khare et al. | |
| 6,782,444 B1 | 8/2004 | Vishlitzky et al. | |
| 7,269,825 B1 | 9/2007 | Adcock | |
| 8,275,935 B2 | 9/2012 | Suzuki | |
| 8,527,544 B1 | 9/2013 | Colgrove et al. | |
| 8,688,951 B2 | 4/2014 | Yamada et al. | |
| 9,213,649 B2 * | 12/2015 | Koka | G06F 12/1009 |
| 9,390,116 B1 | 7/2016 | Li et al. | |
| 2004/0199727 A1 | 10/2004 | Narad | |
| 2007/0288692 A1 * | 12/2007 | Bruce | G06F 3/061 |
| | | | 711/113 |
| 2009/0172287 A1 | 7/2009 | Lemire et al. | |
| 2009/0182948 A1 | 7/2009 | Jiao et al. | |
| 2011/0161594 A1 | 6/2011 | Kiyota | |
| 2012/0198174 A1 | 8/2012 | Nellans et al. | |

(Continued)

OTHER PUBLICATIONS

"VNX Fast Cache", EMC, Dec. 2013.

(Continued)

*Primary Examiner* — David Yi
*Assistant Examiner* — Alan Otto
(74) *Attorney, Agent, or Firm* — Workman Nydegger

(57) ABSTRACT

Systems and methods for accessing data stored in multiple locations. A cache and a storage system are associated with an index. Entries in the index identify locations of data in both the cache and the storage system. When an index lookup occurs and an entry in the index identifies at least two locations for the data, the locations are ordered based on at least one factor and the data stored in the optimal location as determined from the at least one factor is returned.

17 Claims, 7 Drawing Sheets

(56) References Cited

U.S. PATENT DOCUMENTS

| | | | |
|---|---|---|---|
| 2012/0221776 | A1 | 8/2012 | Yoshihashi et al. |
| 2012/0239854 | A1 | 9/2012 | Hsueh et al. |
| 2012/0239860 | A1 | 9/2012 | Atkisson et al. |
| 2013/0067245 | A1 | 3/2013 | Horovitz et al. |
| 2013/0166816 | A1 | 6/2013 | Atkisson et al. |
| 2013/0185508 | A1 | 7/2013 | Talagala et al. |
| 2013/0204854 | A1 | 8/2013 | Brown et al. |
| 2014/0013025 | A1 | 1/2014 | Jannyavula Venkata |
| 2014/0032853 | A1* | 1/2014 | Lih ............... G06F 12/0817 711/141 |
| 2014/0115251 | A1 | 4/2014 | Belluomini et al. |
| 2014/0223103 | A1 | 8/2014 | Rudelic et al. |
| 2014/0331013 | A1* | 11/2014 | Ishii ............... G06F 12/084 711/145 |
| 2015/0149720 | A1* | 5/2015 | Suzuki ............. G06F 12/0871 711/118 |
| 2015/0261468 | A1* | 9/2015 | Khoyi ............. G06F 3/0619 711/114 |
| 2017/0123725 | A1 | 5/2017 | Miller et al. |

OTHER PUBLICATIONS

Costanzo, Carlo. "Enabling FAST Cache on your EMC Clariion with Flash Drives" yCloudinfo.com Nov. 18, 2010.

Krzyzanowski, Paul. "Memory Management: Paging." Rutgers University, Mar. 21, 2012.

Li, Cheng, et al. "Nitro: a capacity-optimized SSD cache for primary storage." 2014 USENIX Annual Technical Conference (USENIX ATC 14). 2014.

Liu, Yang, and Wang Wei. "FLAP: Flash-aware prefetching for improving SSD-based disk cache" Journal of Networks 9.10 (2014): 2766-2775. (Year: 2014).

Lu, Youyou, Jiwu Shu, and Weimin Zheng. "Extending the lifetime of flash-based storage through reducing write amplification from file systems" Presented as part of the 11th USENIX Conference on File and Storage Technologies (Fast 13). 2013.

Mao, Bo, et al. "Read-performance optimization for deduplication-based storage systems in the cloud." ACM Transactions on Storage (TOS) 10.2 (2014): 6.

Saxena, Mohit, Michael M. Swift, and Yiying Zhang. "Flashtier: a lightweight, consistent and durable storage cache." Proceedings of the 7th ACM european conference on Computer Systems. ACM, 2012.

Silberschatz, Abraham, and Peter Baer Galvin. "Demand Paging: Operating system concepts". Silberschatz and Galvin, 1999.

* cited by examiner

MULTIPLE LOCATION INDEX

FIELD OF THE INVENTION

Embodiments of the present invention relate to systems and methods for indexing data stored in a storage system. More particularly, embodiments of the invention relate to systems and methods for an index that identifies data locations in multiple locations and/or in multiple storage systems.

BACKGROUND

The performance of a storage system can be improved with the addition of a cache. Flash caches such as solid-state drives (SSDs) can be incorporated into storage systems and can be quite large. Data stored in the cache is accessed using an index, which identifies the location of data in the cache. Because the flash cache may be large, the index may need to be stored in the flash cache itself because the index may be too large to fit in memory (e.g., RAM).

In general, there are various operations in which it is necessary to access the index or perform an index lookup. Read, write, and inquiry operations are examples of operations that are associated with index lookups. In addition, index updates are also expensive operations at least in terms of I/O and media longevity, because an index update requires both an erasure operation and a write operation.

When the index is stored in the flash cache, accessing data in the flash cache becomes more expensive at least in terms of I/O operations. Because the index is stored in the flash cache, accessing the index is equivalent to accessing the flash cache. The number of I/O operations to the flash therefore increase because any request to access data stored in the cache usually requires that the index be accessed first. If each data access requires a corresponding index lookup, the flash cache is effectively accessed at least twice for each read operation. Even though a flash cache can be fast, the response time of the flash cache is affected. Systems and methods are needed to improve the performance of a flash cache and to reduce or minimize index lookup operations.

In addition, when data is not found in the cache, it may be necessary to look to another storage system for the data. This requires yet another index lookup operation on that storage device. Systems and methods are needed for indexing data that may reside in multiple locations within a computing system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
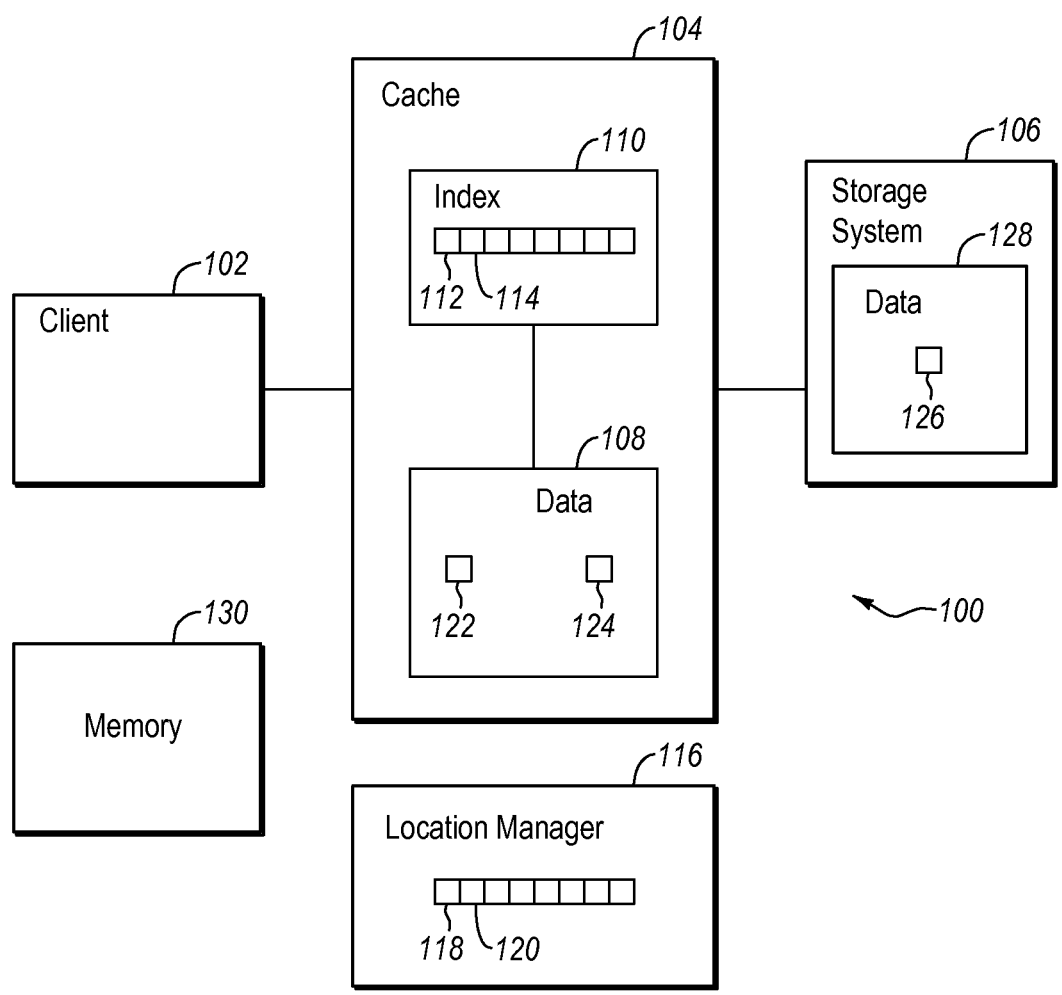
FIG. 1 illustrates an example of a computing system in which index lookup operations can be reduced or minimized.

Embodiments of the invention relate to systems and methods for indexing data stored in different locations and/or in different storage devices. Embodiments of the invention relate to systems and methods for an index (e.g., a single index) that identifies locations of data stored in a cache and in a storage system. By storing multiple locations of data in a single index, data can be retrieved from an optimal location that is selected from the locations stored in the index. The optimal location may be based on an evaluation of the locations. The evaluation may consider one or more factors.

Embodiments of the invention further relate to reducing index input/outputs (I/Os). Embodiments of the invention further relate to reducing index I/Os when performing read operations, write operations, modify operations, or the like. Embodiments further relate to minimizing the number of times that an index is accessed during operations including read operations, write operations, and modify operations.

Embodiments of the invention are discussed with reference to an index of a storage system that includes, by way of example only, a cache (e.g., a flash cache or SSD) and a more permanent storage, which may include tiered storage. The index may be specific to the cache or may reference the entire storage system or any portion thereof. The index may include one or more locations per entry. When an index lookup operation is performed, the response may depend on how many locations are present or stored in the relevant entry. The response may also depend on which locations of the data are present or valid.

For example in a system that includes a cache and a storage system (or two potential locations), an entry in the index may include a single location pointing to the cache location or the storage system location. The index may include two locations in a particular entry for requested data or for a requested data block: one to the cache location and one to the storage system location. The index may, in some examples, have no entries for certain data. The number of potential locations in an entry in the index may depend on how may storage locations are available. Embodiments of the invention are not limited to one or two locations.

Embodiments of the invention can be implemented in a computing environment that includes, by way of example, one or more clients, at least one cache, and at least one storage system that includes one or more storage devices. The clients can include any device that can interact with the cache and/or the storage system. Example clients include, but are not limited to, smartphones or other cellular devices, tablet devices, laptop computers, desktop computers, server computers or the like. The communications between the clients, cache and storage system can occur over direct connections or network connections or multi-network connections and can include wireless connections and/or wired connections. The computing systems can vary in size and complexity and may include, but are not limited to, a single device, a high availability system, a local area network, a datacenter, the Internet, or the like or any combination thereof.

In one example, the storage system includes hard disk drives (HDDs). The cache may include a faster storage device such as a solid-state drive (SSD) as a flash cache. Using SSDs as a caching layer dramatically increases the amount of data that can be cached. An SSD flash cache can be very large and can store a significant portion of the underlying storage system. By way of example, the SSD cache may have a capacity equal to 5-10% of the storage system. The capacity of the cache is not limited to this range however and can be smaller or larger.

A large cache, however, also requires a large index to track what segments or blocks (referred to herein generally as data) are in the cache and where the data are located in the cache. The index may also track locations of the same data in another storage system or another location. For various reasons (e.g., the size of the flash cache), the index may not fit in memory (a higher level cache than the flash cache) economically and may be either partially or wholly kept on storage media such as within the flash cache itself. As a result, looking up data in the index can be expensive in terms of I/Os because of the associated queries to the index and subsequent queries for the data once the location is determined from the index lookup. In some embodiments, there may be multiple indexes within the cache that must be queried to determine whether data is located in the cache and its location. Embodiments of the invention reduce the number of times that the index is accessed and can improve the performance of the flash cache and the performance of the storage system.

An index lookup can be used to identify the location of the data in the cache and/or in the storage system. This avoids, in some instances, the need to access an index of the storage system. For example, a single index lookup can provide information that the requested data is only located in the cache and/or the storage system. Because the index includes all location of the data, the data can then be retrieved without an additional index lookup operation. If the data is in both locations, then the data is retrieved from the optimal location, which may be the flash cache location. If the data is only in the storage system, then the data can be retrieved without performing another index lookup operation.

The index may be queried for several different reasons. In one example, index queries may be performed when the cache is a de-duplicated cache. De-duplication means that only unique data is stored, though there may be multiple references to a data item or segment. The index may be queried when there is a request for data from a client. The index may also be queried when there is an insertion request to ensure that a duplicate copy of the data is not inserted into the cache. The index may also be queried when the data is invalidated and/or deleted from the cache. The storage system may also be de-duplicated in one example.

For some operations, the same segment or data may be queried within a short period of time to complete the client request. For example, a read-modify-write request will query both the index and the cache to read the data and then query the index to invalidate the overwritten data (which was just read). There may be additional operations when the new data is written to the cache and the location of the new data is added to the index. When data in the cache is invalidated, the data in the storage system may also be invalidated. Optionally, the data could be retained. As modified data is written to the storage system, the index may also be updated as necessary. If the modified data is written to the cache and the storage system at the same time, a single index lookup may be performed to update the index for both locations.

Embodiments of the invention preserve the location information or index information during an operation. As a result, a second query to the index is not necessary because the location information is preserved.

Similarly, for operations such as read requests, the returned data may be cached at a higher level cache (such as a memory buffer cache). When this data is evicted from the memory buffer cache, an attempt may be made to insert the data back into the lower level cache (e.g., the flash cache). This reinsertion attempt would require an index lookup. However, this index lookup can be avoided by providing some hints as to the origin of the data, for example whether the data came from the flash cache or the storage system. In this way, an index lookup is avoided if the origin was from the flash cache and the data is assumed to reside in the cache.

Embodiments of the invention reduce the number of index queries for at least these scenarios where data may be read and shortly after either invalidated or re-inserted. In one embodiment, meta-data such as location data (potentially opaque to the client) is included with the returned data and the location data indicates the origin or location of the data in some embodiments. The location data can be used when writing back to the cache or when inserting or re-inserting the data into the cache. This allows for optimizations by avoiding an index lookup.

In some examples, a segment or data in the cache may be invalidated. Marking a segment or data as invalid may indicate that the segment or data is not a valid response to subsequent queries for the data. Segments or data may be invalidated because the segment or data is deleted, the corresponding file/LUN position is overwritten, the age of the segment or data has passed a threshold, or the like. There may be situations, however, where the old data is retained in addition to any modified data that may be written to the cache or to the storage system.

For client calls requesting to invalidate a segment in the cache and/or in the storage system, the location data or other meta-data (indicating a segment location from a previous index lookup or, in other words a data location) would be used to mark an in-memory data structure, for example a location manager such as a bitmap, to indicate that the segment is invalid. In one example, a location manager has a bit for each entry in the cache. More specifically, the location manager may include a bit for each location of the segment or data in each entry. Other data structures besides a bitmap may serve the same purpose. The location manager is used to record this information since updating the index in the flash cache may take place in an offline manner with some delay between invalidation operations and updates to the index. This process does not incur additional I/O to the index because the location manager is in-memory and invalidated segments are batched for cleaning later.

Conventionally, after reading a segment from the cache, the client may not have a mechanism to track where the data came from, and the client may attempt to reinsert the segment into the cache. In some embodiments of the invention, the location data indicating segment location would allow a quick in-memory check to validate that the container (a way of storing data in the cache or the storage system) or data is still available on cache. If the container or data is still available, then no cache query or reinsertion is necessary.

In another example, the request for data is implemented as a read-and-invalidate call to the cache. The segment data would be queried and returned to the client. At the same time, the location from which the data was retrieved or all locations of the data would be invalidated, for example by marking a corresponding entry in a location manager. In some example, the data may only be invalidated from the cache. Subsequent requests for that data would miss at least in the cache. The read-and-invalidate call could be made for read-modify-write operations to prevent a second call to the cache to invalidate the old version of the segment or data. In another example, a small in-memory cache of recently read index entries is maintained and can be used in these situations.

In a read-modify-write context, the newly modified data or segment is written to the cache. The location of the newly modified segment is added to the index immediately or in an offline manner. The newly modified segment or data may also be written to the storage system and the index may also reflect this location of the data. Additions to the cache can be batched, for example.

FIG. 1 illustrates an example of a computing system in which embodiments of the invention may be implemented. FIG. 1 illustrates a client 102 that can communicate with a cache 104 and a storage system 106. The storage system stores data 128. The cache 104 may be a flash cache (e.g., an SSD) and may be an intermediary storage between the storage system 106 and the client 102. The cache 104 is typically faster and smaller than the storage system 106. The cache 104 stores data 108 and an index 110. In other words, the index 110 is maintained in the flash cache 104 itself in one embodiment. The index 110 can be stored in another location however. In one example, the data 108 stored in the cache 104 includes data that has been recently used or accessed by the client 102 or that is frequently used by the client 102, or the like. The data may be located in the cache and/or the storage system using a key or other appropriate manner.

The data 108 is, in one example, a subset of the data 128. Thus, the index 110 references the data 108 stored in the cache 104 and/or the data 128 stored in the storage system 106. The index 110 may not have an entry for each segment or data stored in the storage system 106. In one example, the index 110 may build over time. For example, as more data is accessed from the storage system 106, the index 110 may increase in size. In addition, the size of the index 110 can be pared down if necessary, for example, by removing entries that have not been accessed for a certain period of time or that have moved to a lower tier storage level. In some examples, another index may exist for some data in the storage system.

When data is evicted from the cache, the corresponding entry in the index 110 may be partially cleaned. The location in the index 110 referencing the location in the cache may be deleted while the location referencing the storage system 106 may be retained. In one example, policies may be set on the index 110 such that entries associated only with the storage system 106 may be deleted or purged over time.

For example, the entry 112 identifies at least a location of the data 122 in the cache 104 and the entry 114 identifies at least a location of the data 124. The manner in which the location is identified can depend on how the data is stored and on the structure of the cache or the format of the cache. An entry in the index 110 may alternatively identify a location of the data 126 stored in the storage system 106. In another example, an entry in the index 110 may identify the location of data in both the cache 104 and in the storage system 106. When an entry in the index identifies multiple locations, the locations may be ordered according to one or more factors when the data is retrieved or when entered in the index 110 or at another time. The data returned to the client may be based on the way the locations are ordered.

When the client 102 issues a lookup request for data, a key may be provided and the index 110 is checked first using the key. The key may be, by way of example, a hash, a file and an offset, a logical unit number and a logical block address, an object identifier, or other identifier that can be used to identify the location of the data in the cache corresponding to the key.

In one example, entries in the index 110 are updated in a batch process where multiple entries are updated during the same process. For example, a group of invalid entries may be cleaned or removed at the same time or during the same operation. An entry in the index 110 needs to be updated, for example, when the corresponding data is invalidated. Data can become invalidated for many reasons, including but not limited to, overwrites, file deletions, cache evictions, data corruption, hardware failures, cache shrink operations, time or the like or combinations thereof.

Because the index 110 may be updated during a batch process, it may be necessary to identify locations in the cache 104 and/or the storage system 106 and/or in the index 110 that are no longer valid. In one example, a location manager 116 may be used to track which entries in the index 110 are invalid. In one example, the location manager 116 is maintained in a memory (e.g., RAM) 130. The memory 130 may be associated with the storage system 106 and/or the cache 104. In one example, the memory 130 may reside on the client 102. Each entry in the location manager may correspond to an entry in the index 110. For example, the entries 118 and 120 in the location manager 116 may correspond to the entries 112 and 114 in the index 110. In effect, entries in the location manager 116 also correspond to locations of the data 108 and the data 128.

In one example, each entry in the location manager 116 may be a single bit or may include a single bit for each location. A 0 may represent a valid entry and a 1 may represent an invalid entry. When data is invalidated, the corresponding entry in the location manager 116 is set to a 1 in this example. An entry of 10 (wherein the first bit corresponds to the cache and the second bit corresponds to the storage system) in the location manager 116, for example, may indicate that the data in the cache is invalid while the data in the storage system is valid. Other data structures may be used as the location manager 116 to track the entries in the index 110. In some embodiments, entries in the location manager 116 may include additional information about the entries or the corresponding data or the corresponding locations of the data.

In one example, one or more of the cache 104, the memory 130, and the storage system 106 may be part of a server computer or part of a plurality of servers or a server system. Such a server system may be a file server, a database server, an email server, a backup server, or the like. Thus, the memory 130 is included in the server computer and the location manager 116 may be maintained in the memory 130. The memory 130 may be RAM or another memory buffer. The location manager 116, for example, may be maintained in the memory 130.

Figure 2:
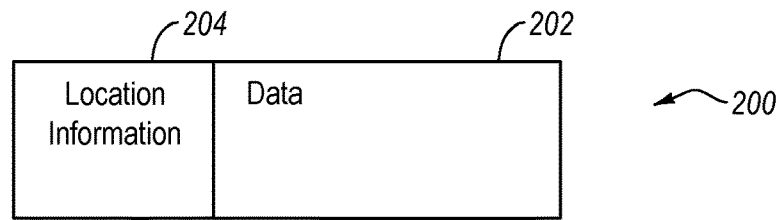
FIG. 2 illustrates an example of a block that is returned in response to a data access operation and that includes location information in addition to the requested data.

FIG. 2 illustrates an example of a block returned in response to an access operation or an index lookup. Embodiments of the invention can reduce the number of index lookups in one example with a block 200. The block 200 includes, in one example, data 202 and location information 204. The data 202 corresponds to the data was requested by the client. The data 202 may have been retrieved from one of the locations identified in the index. The location information 204 typically corresponds to the same location from which the data 202 was read. However, the location information 204 may include information about all locations of the data 202.

The location information 204 includes information about the data 202. The metadata included in the location information 204 can vary in size from a single bit to a larger size. The size of the location information 204, however may affect the information conveyed by the location information 204. In one example, the location information 204 identifies where the data is stored in the cache and/or in the storage system. The location, however, can be as general as the cache or the storage system. The location can be more specific and specify the exact location of the data in the cache and/or the storage system.

By way of example, the location information 204 may include an origin of the data 202 (e.g., the flash cache, the storage system, or the like), a container identifier (an identifier that can be used to address the location manager in memory), a block identifier (a physical identifier from which data can be read), a block ordinal position (a position inside the container), a block byte offset (an offset inside the container), and/or a cache generation identifier. The container identifier, block identifier, block ordinal position, and block byte offset may specify a precise position in memory or in the cache or in the storage system. One or more of the foregoing examples can be included in the location information. The location information is not limited to this information however.

The cache generation identifier may relate to cache generations. A cache can ensure that data is valid for a certain number of generations. Thus, the cache generation identifier can be used to determine whether the data is still in the cache when the current cache iteration is in an appropriate range.

In a conventional system, for example, a read-write-modify operation requires at least two index lookups. For example, the client may read the data from the cache. This requires a first index lookup to determine if the data is stored in the cache. In one example, more than one entry in the index may be checked. The data is then returned to the client by reading the data from the location indicated by the index. The client may then modify the data.

After the data is modified, the client may write the new or modified data back to the cache. However, a request to invalidate the previous version of the data is necessary in this case and this requires a second index lookup to invalidate the old entry of the data. As a result, the index is read multiple times in read-modify-write operations. A similar issue arises when inserting previously read data that may have been stored in RAM or other memory.

Figure 3:
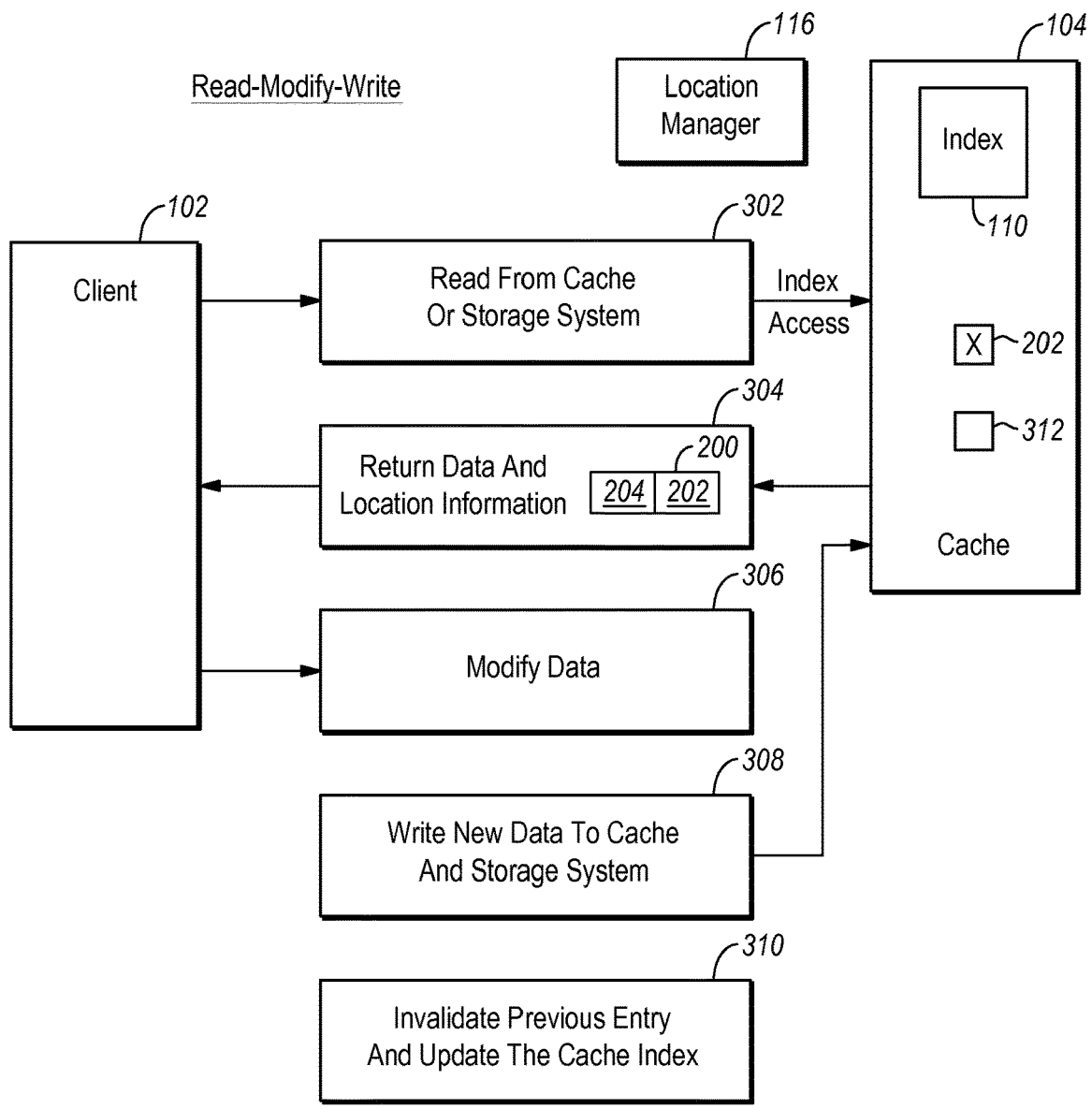
FIG. 3 illustrates an example of systems and methods for performing read-modify-write operations while reducing or minimize index lookups.

FIG. 3 illustrates an example of a method for performing a read-modify-write operation while reducing or minimizing index lookups. In box 302, the cache is read is response to a request from a client 102. Depending on the result of the index lookup and the locations of the data, the data may be read from the cache or the storage system for example. The request may identify or include a key in one example. Reading the cache 104, however, requires an index access or an index lookup operation to determine a location of the requested data.

In box 304, a block 200 is returned to the client. The box 200 includes the requested data 202 (which may have been read from the cache 104 or from the storage system 106.). The block 200 also includes location information 204 about the requested data.

The location information 204 may be opaque from the perspective of the client 102. The location information 204 may provide an indication as to the origin of the data 202. The specificity of the location information 204 can vary. The location information 204 may be a single bit (Boolean) that identifies its origin as the cache 104 or the storage system 106. The location information 204 may, however, be more robust and include information similar to that maintained in the index 110. Other variations are also possible. The client 102 may keep the location information 204 in memory. The location information 204 may be a copy of at least some of the location information that was stored in the entry of the index 110 associated with the requested data.

In box 306, the data 202 may be modified by the client 102. After the data 202 has been modified by the client 102, the new data may be written to the cache 104 as data 312 in box 308. The new data may also be written to the storage system in box 308. In one example, if the data was originally read from the storage system, the new data may be written to both the cache and the storage system.

In box 310, the data 202 is invalidated because the new or modified data is now being written to the cache 104. The old data 202 can be invalidated, in one example, by making an appropriate change in the location manager 116, which may be stored in memory 130 of the server in one example. Because the location information 204 has been retained during the read-modify-write operation, the location of the data 202 can be invalidated without having to access the index 110. In other words, the location information 204 allows the data 202 or the location of the data 202 to be invalidated because the location is known from the location information. The corresponding entry in the index 110 is also known and may be cleaned immediately or at another time.

In another example, the location information 204 identifies an entry in the index 110. The data 202 can be invalidated by marking the corresponding entry in the location manager 116 that corresponds to the entry in the index 110 associated with the data 202. Thus, the data 202 can be marked as invalid in the location manager 116 without having to access the index to find the location of the data 202. Advantageously, an index lookup is avoided in this example and the data can be effectively invalidated without performing an index lookup. The cleanup process can be performed in a batch process at a later time if desired.

Figure 4:
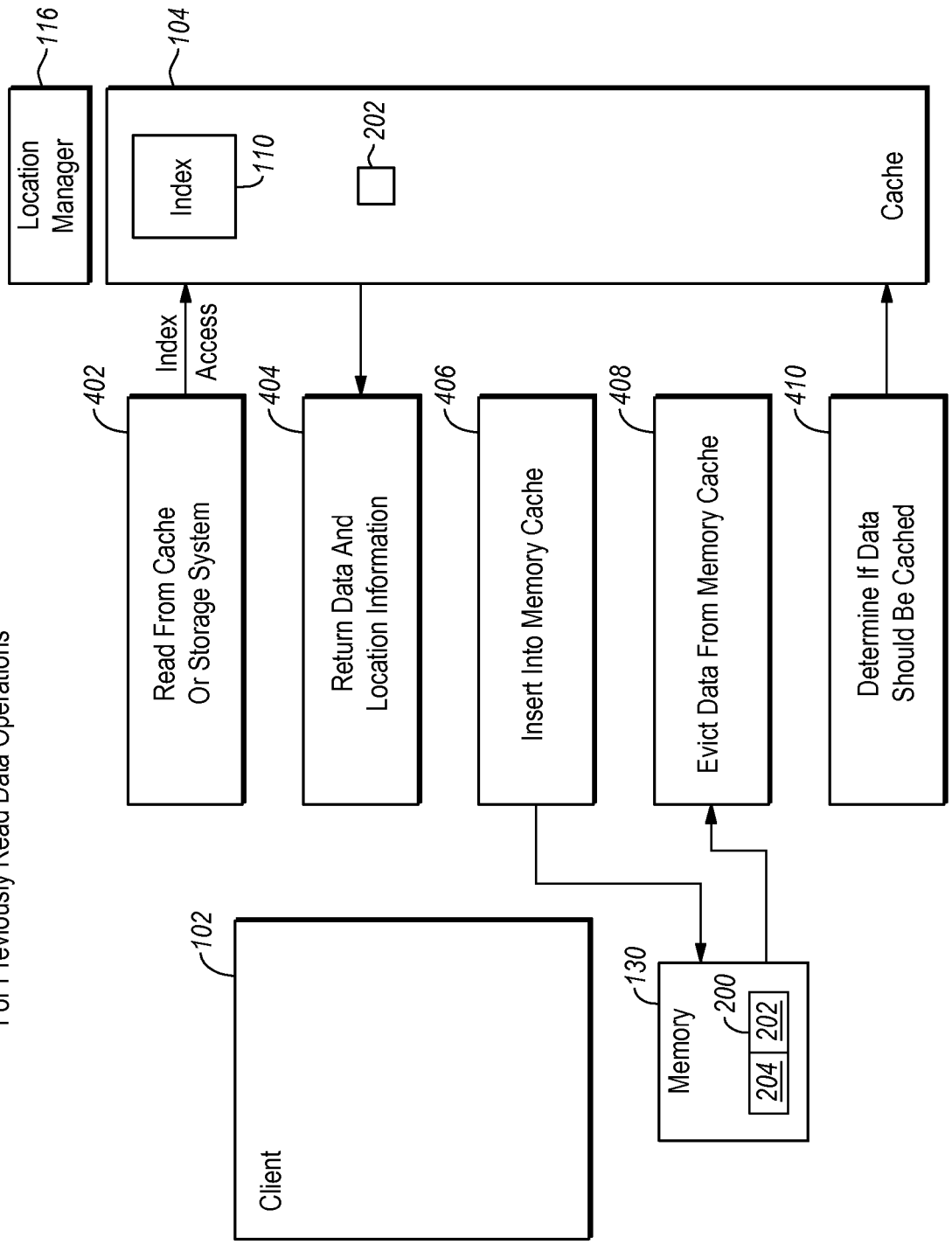
FIG. 4 illustrates an example of systems and methods for re-inserting previously read data into a cache while minimizing or reducing index lookups.

FIG. 4 illustrates an example of a method for efficiently determining whether to insert previously read data into a cache. In box 402, a request for data is made by the client 102. Accessing the requested data 202 requires an index lookup in the index 110. During the index lookup operation, as previously indicated, more than one location may be identified. In this case, the locations may be ordered and the data is returned from an optimal location in accordance with the ordering of the locations. By ordering the locations, data from the optimal location according to various factors can be returned. As previously stated, a key may be used to access the index 110 and identify the location of the data 202. The data 202 from the optimal location is then returned to the client 102 in box 404 as the block 200.

In box 406, the block 200 is inserted into the memory 130, which is an example of another cache level. The block 200 and thus the data 202 may remain in the memory 130 for a period of time. In box 408, the data 202 is removed from the memory 130. For example, the data 202 may be evicted from the memory 130.

In box 410, a determination is made as to whether the data 202 should be reinserted into the cache 104. In this example, the location information 204 could be a Boolean value that identifies the origin of the data 202. In another example, the location information 204 may include metadata that allows the location manager 116 to be checked to see if the data is still cached. In another example, additional information such as the container ID and the like may be required. This information can be compared with the corresponding entry in the location manager 116. If the location manager 116 indicates that the location is still valid and the location information identifies the cache as the origin of the data, then the data is not inserted into the cache 104. If the location manager 116 indicates that the location is invalid, then the data is written to the cache. If the location information indicates that the data was initially retrieved from the storage device, the data may be inserted into the cache 104.

Thus, the location information 204 can be used to determine if the data 202 should be inserted back into the cache 104. When the location information 204 indicates, in one example, that the data 202 originated from the cache and it is determined that the data 202 in the cache is still valid, the data 202 is not inserted because the data 202 is already in the cache. This avoids an index lookup to determine if the data is still cached and avoids inserting duplicate data in the cache 104.

It is possible that while the data 202 is stored in the memory, the corresponding data 202 in the cache 104 may be evicted. In this example, the location information 204 may include a location value. With this value, the location manager 116 can be checked to determine whether the location is still valid or whether the data is still located in the cache 104. If the data is not in the cache, then a determination may be made to insert the data 202 back into the cache 104.

If the data 202 is modified by the client 102, then the corresponding entry in the location manager can be marked as invalid and the method may proceed as previously described.

In each of the examples discussed herein and in accordance with the various operations discussed herein, the location manager 116 and/or index 110 is updated to reflect the status of the old data, newly modified data, and the like and in accordance with the operation performed. However, this update of the index can be batched as previously described.

Figure 5:
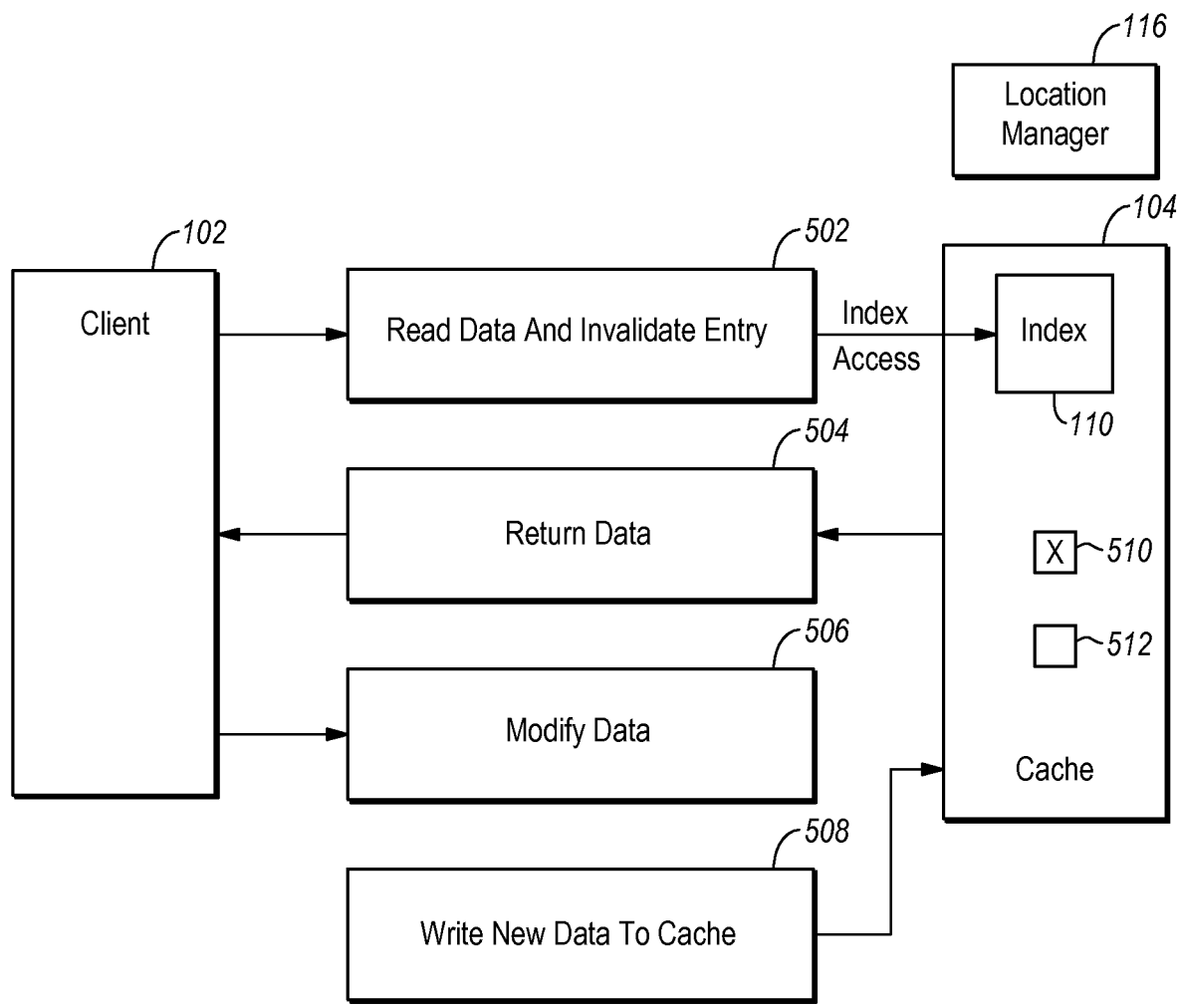
FIG. 5 illustrates an example of systems and methods for avoiding index lookups by invalidating entries in a cache or other storage device when the data is read.

FIG. 5 illustrates an example of a method for avoiding index lookups by invalidating entries corresponding to the data when the data is read. In box 502, a request is made to access data 510 in the cache 104 and/or in the storage system 106. This requires an index lookup and may include selecting one of the locations for the requested data as reflected in the index. At the same time, an entry in the location manager 116 is changed to reflect that the data 510 is considered to be invalid. When two or more locations are identified in the index lookup, the entry in the location manager 116 that is being marked as invalid may correspond to the location of the data that was returned. In other words, once the valid data is returned, the entry in the location manager 116 corresponding to the location of the data that was returned is marked as invalid. In one example, both locations in the entry of the location manager 116 corresponding to the requested data may be changed to mark as invalid. The valid data is returned to the client in box 504. In box 506, the data 510 is modified. In box 508, the new data is written to the cache 104 and/or the storage system 106 as the data 512. The index 110 may be changed or updated to reflect the location or locations of the new data. In one example, the write performed in box 508 does not need to invalidate the previous version of the data which would require another index lookup. For example when the index key is a content defined hash, the index keys of the data 510 and the data 512 will be dramatically different and would require looking up in different locations of the index.

When data is marked as invalid, various actions may be taken. For example, the old data may be left alone until the new data is written to memory. The old data may be maintained for backup or archive purposes.

Figure 6:
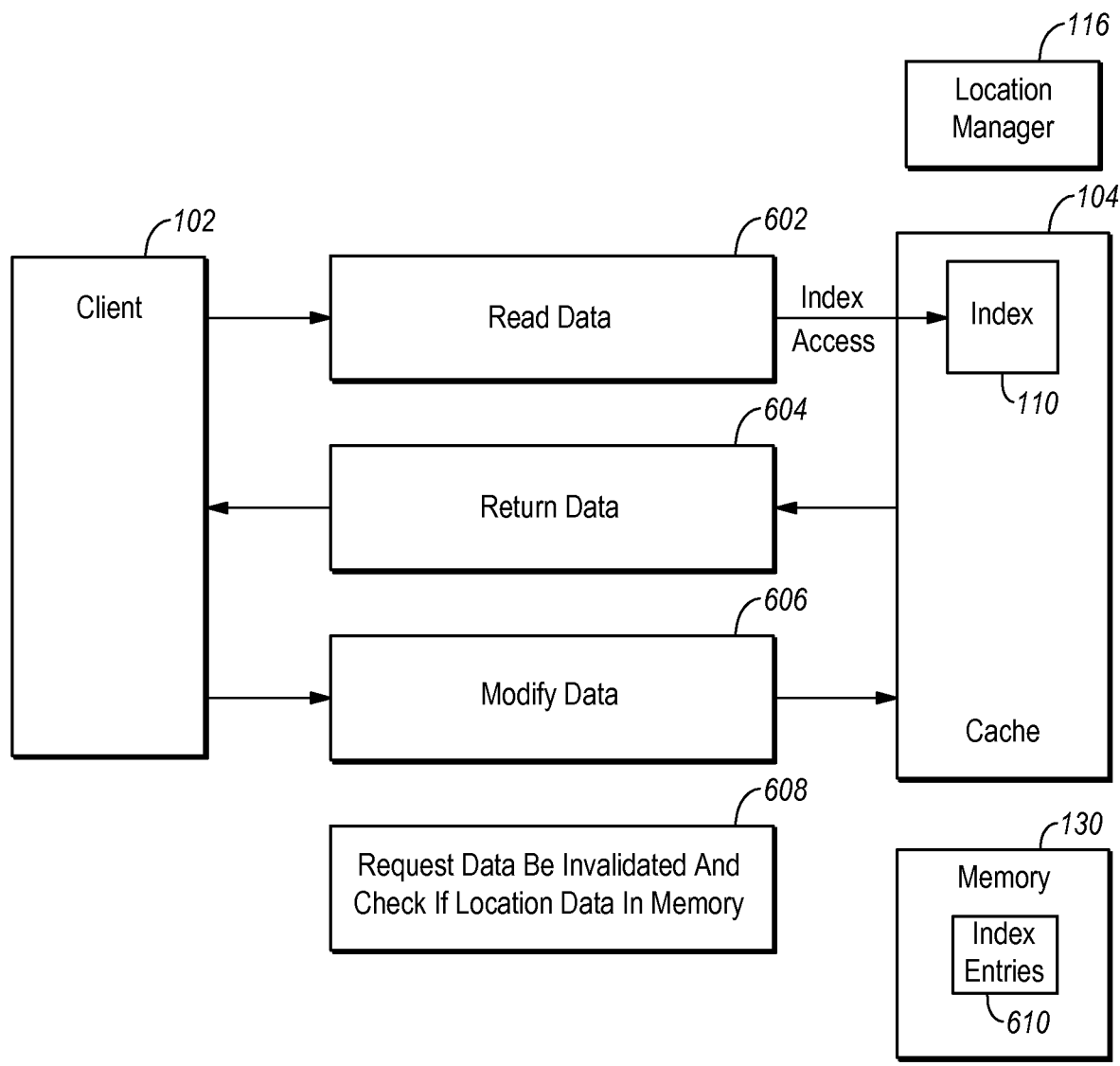
FIG. 6 illustrates another example of systems and methods for reducing index lookups.

FIG. 6 illustrates another example for reducing index lookups. In box 602, data is read from the cache 104 or the storage system 106, depending on the locations in the index 110. The read operation requires an index lookup as previously describe and may require that the data be selected from one of multiple sources or locations. In box 604, the data is returned to the client 102. A block 200 may be returned that includes location information. The data is modified in box 606.

FIG. 6 also illustrates that a cache of index entries 610 may be maintained in the memory 130 of the server (or in another location or memory). The cache of index entries 610 may include a cache of, for example, the location information associated with recently accessed data. When the data is written to the cache 104 after having been modified, the cache of index entries can be checked for the location information. By keeping recent index entries in the memory 130, an index lookup operation can be avoided. Rather, the location information stored in the cache of index entries 610 can be used to determine how to handle the data being written to the cache. For example, if the location information of the data is in the index entries 610, then the new data is written to the cache and the appropriate entry in the location manager 116 for the old version of the data can be marked as invalid based on the location information maintained in the cache of index entries 610 in the memory 130. As discussed herein, the location manager 116 is updated as necessary for all locations of the old data and the newly modified data.

The foregoing discussion thus illustrates that index lookups or index access operations can be reduced. In one example, location information is returned with the data such that the location information can be tracked. More specifically, the location information can be used to access the location manager to mark a particular entry, which corresponds to data in the cache or to a location in the cache, as invalid.

In another example, the entry in the location manager can be marked as invalid when the read operation is performed. In this example, it may not be necessary to return location information with the data because the appropriate entry in the location manager has already been marked as invalid.

In another example, a cache of recent index entries that were looked up is maintained in memory other than the cache and different from the location manager. When the data is written, the cache of recent index entries can be used to invalidate the entry in the location manager instead of performing an index lookup. Embodiments of the invention, as discussed herein, thus relate to systems and methods for accessing a cache that is associated with a storage system.

Figure 7:
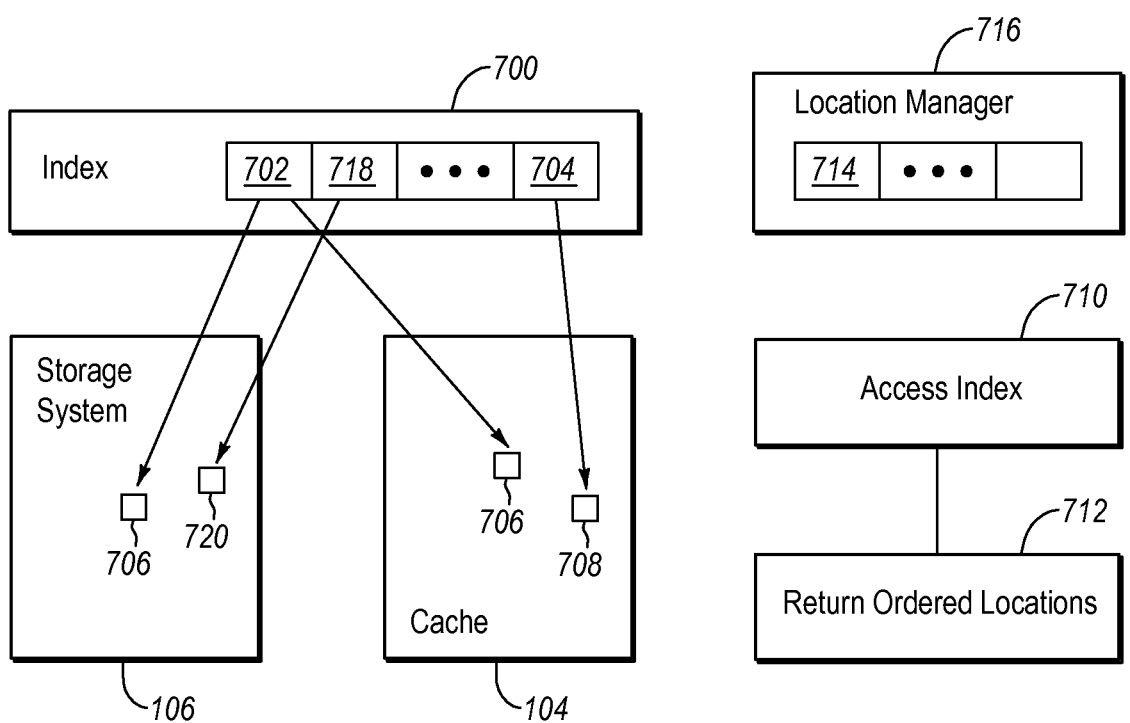
FIG. 7 illustrates another example of an index.

FIG. 7 illustrates an example of an index to further illustrate an index where each entry in the index can reference one or more locations. In FIG. 7, the index 700 includes entries that may be associated with more than one location. The entry 702, for example, is associated with the data 706 in the cache 104 and with the data 706 in the storage system 106. The entry 704 may only include a location of the data 708 in the cache 104. The entry 718 may identify a location of the data 720, which may only be present in the storage system 106.

The location manager 716 may be similarly configured. The entry 714 may also correspond to the data 706 in both the cache 104 and the storage system 106. During a read-modify-write operation, or other operation the appropriate locations in the location manager 716 can be marked as invalid or updated in accordance with the operation performed. The location manager 716 is thus configured to handle multiple locations in each entry. When the location manager 716 is marked to invalidate the data in the cache, the entry for the copy of the data in storage system may remain valid.

In a conventional system, there is an index for the cache and a separate index for the storage system. When responding to a read request, the index is checked first. If the index misses, the storage index is checked. In contrast, an index 700 can include more than one location in each entry and allows the location of data to be identified from a single index lookup operation instead of two index lookup operations.

When the index 700 identifies more than one location for the requested data, a process may then be performed to determine which copy of the data should be returned. There may be reasons to prefer one location over another location. A cost function, for example, may be used to determine which location to use when responding to a request for data. The locations may include, by way of example only, both caches, storage, or tiers of storage. For example data could be stored in a local storage system, or in a local cache, or in a remote storage system, or a remote cache. Remote storage systems could include cloud storage. Data can be stored on different types of media, some being faster to access, some being more expensive to use.

This is basically described in FIG. 7. An index lookup operation may include an index lookup in box 710. The index may identify more than one location for the requested data and a decision is made with respect to which location is used. In box 712, the results are returned as ordered locations and the data returned to the client is from the optimal location, based on the ordering.

More specifically, when more than one location is present in the index 700, the locations may be ordered according to some property or factor. The ordering may be performed, for example, when responding to a read request or other index lookup. For example, the locations may be ordered based on expected access time, where data stored in locations with faster expected access times are returned before data stored in locations with slower expected access times. Another property or factor to consider is the financial cost of accessing data. Some storage systems charge for accesses, such as cloud storage providers, so accesses that are less expensive may be preferred. Alternatively, a single location may be returned based on the same property. Whether the data at a particular location is valid may be another factor that affects the ordering of locations.

When a read-modify-write operation or other operation is performed, the number of I/Os (e.g., to the index 710) can be reduced and the appropriate one or more locations in entries in the location manager 716 can be marked as invalid.

Figure 8:
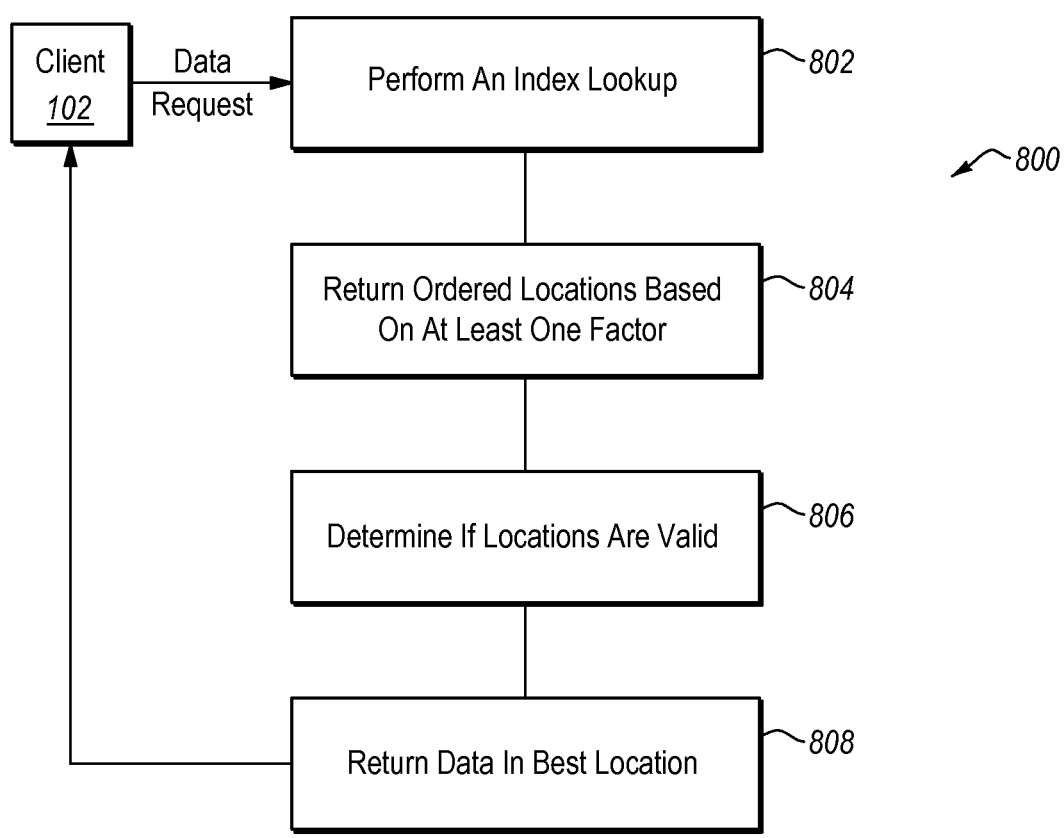
FIG. 8 is a flow diagram for accessing data in the context of performing an index lookup.

FIG. 8 illustrates an example of a method 800 for returning data in response to a request for the data. When the client 102 makes a data request, an index lookup is performed in box 802. In this example, the entries in the index (e.g., the index 700) may identify more than one location for the requested data. In box 804, the locations of the requested data are ordered. In box 804, the locations may be ordered based on at least one factor. Example factors include those previously mentioned such as expected access time, financial cost, and validity of location. Other factors may include the urgency of the request, the status of the requestor, or the like.

In box 806, a determination is made as to whether the locations are valid. This may include referencing the location manager 716. The location manager may also represent multiple locations per entry. Thus, accessing the location manager 716 may determine that only one of the locations is valid. In box 808, the data in the best location (e.g., first in the ordered results) is returned to the client 102.

For example, if the index includes two locations for a requested data, the method 800 may determine that the location in the cache should be returned because the cache provides faster access and because there is no cost associated with returning the data from the cache. If the data in the cache is valid, the data can be returned to the client. If the copy in the cache is determined to be invalid, then the next location in the ordered results is used. In this case, the data may be returned from the storage system.

In one example, the validity of the locations may be determined before the ordered locations are determined or ordered. Thus, the validity of the locations is another factor that can be used when ordering the locations.

In one example, when the data is modified by the client, the data is treated in accordance with the operating system parameters or in accordance with policy or in accordance with user rules. Modified data, for example, can result in the old data being invalidated. This can be done by marking the location manager for all locations corresponding to the old data. This can also be done by directly updating the index, by overwriting the old data, or the like. In another example, the old data may be retained and simply evicted from the cache.

A single index for multiple data locations can also be used in systems and methods that may not be configured to reduce index lookup operations. However, a single index can reduce index operations by itself because the need to access a storage system index when a index misses is reduced.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a memory, a cache and a storage system, a method for accessing data stored in the cache and/or the storage system, the cache comprising a solid state memory, the method comprising:
   performing an access, modify and write operation such that an index lookup operation in an index stored in the cache is performed a single time for data accessed by the access, modify and write operation by:
   performing the single index lookup operation for requested data stored in at least one of the cache and the storage system in an index stored in the cache, wherein each entry in the index includes one or more locations of data and wherein an entry associated with the requested data includes at least two locations of the requested data;
   determining which of the at least two locations are valid locations;
   determining that a first location of the valid locations is an optimal location;
   returning the requested data from the first location and returning location information for the requested data based on the single lookup operation with the requested data, wherein the location information returned with the requested data identifies that the requested data was retrieved from the first location;
   storing the location information in a location manager, wherein the location manager is in a memory separate from the cache;
   invalidating the requested data associated with the location information when the requested data has been modified without accessing the index by marking an entry in the location manager stored in the memory that corresponds to the entry in the index and is associated with the requested data that is being invalidated; and
   performing a batch operation to clean the index based on invalidated entries in the location manager.

2. The method of claim 1, further comprising ordering the at least two locations based on at least one factor.

3. The method of claim 2, wherein the at least one factor includes an expected access time of each location.

4. The method of claim 2, wherein the at least one factor includes a financial cost associated with accessing each location.

5. The method of claim 2, wherein the at least one factor includes a validity of data stored in each location.

6. The method of claim 1, further comprising invalidating the data of at least one of the locations when the requested data is modified.

7. The method of claim 1, further comprising invalidating the data at all of the locations when the requested data is modified.

8. A server computer configured to respond to data requests from one or more clients, the server computer comprising:
   a memory, wherein a location manager is stored in the memory;
   a flash cache configured to store one or more data, the flash cache comprising a solid state memory;
   a storage system configured to store the one or more data, wherein an index is stored in the flash cache with the one or more data and each entry in the index includes one or more locations of data stored in the flash cache or in the storage system,
   wherein the server computer is configured to perform an access, modify and write operation such that an index lookup operation in the index is performed a single time for data accessed by the access, modify and write operation by:
   receiving a request for data;
   accessing the index in the flash cache to determine the one or more locations of the requested data;
   determining which of the at least two locations are valid locations;
   determining that a first location of the valid locations is an optimal location;

returning the requested data from the first location and returning location information for the requested data based on the single index lookup operation with the requested information, wherein the location data returned with the requested data identifies that the requested data was retrieved from the first location, wherein the location information is stored in the location manager stored in the memory;

invalidating the requested data associated with the location information when the requested data has been modified without accessing the index when the requested data is invalidated by marking an entry in the location manager that corresponds to the entry in the index of the requested data; and performing a batch operation to clean the index based on invalidated entries in the location manager.

9. The server computer of claim 8, wherein the server computer is configured to order the locations of the requested data based on at least one of expected access time, financial cost to access the requested data, and validity of the data.

10. The server computer of claim 8, wherein a location manager is stored in the memory buffer, wherein each entry in the location manager corresponds to an entry the index, wherein the server computer is configured to invalidate the requested data by changing the corresponding entry in the location manager.

11. The server computer of claim 8, wherein the server computer is configured to invalidate data that has been returned to a client in at least one of the locations when the data is modified.

12. In a system that includes a memory, a cache and a storage system, a method for accessing data stored in the cache and/or the storage system, the cache comprising a solid state memory, the method comprising:

performing an access, modify, and write operation that only requires a single index lookup operation in an index for data accessed by the access, modify, and write operation by:

receiving a request from a client for data at a server computer;

performing the index lookup operation in the index for the requested data, wherein the index is stored in the cache along with data that may include the requested data, wherein the index lookup determines that the index includes one or more locations for the requested data;

determining which of the at least two locations are valid locations;

determining that a first location of the valid locations is an optimal location;

returning the requested data from the first location and returning location information for the requested data based on the single lookup operation with the requested data, wherein the location information returned with the requested data identifies that the requested data was retrieved from the first location, wherein the first location is optimal for retrieval according to at least one factor;

storing the location information in a location manager stored in the memory;

modifying the requested data;

invalidating the requested data associated with the location information when the requested data without accessing the index by marking an entry in the location manager that corresponds to the entry in the index;

writing the modified data to the cache;

entering an entry for the modified data in the index; and performing a batch operation to clean the index based on invalidated entries in the location manager.

13. The method of claim 12, wherein the at least one factor includes an expected access time of each location.

14. The method of claim 12, wherein the at least one factor includes a financial cost associated with accessing each location.

15. The method of claim 12, wherein the at least one factor includes a user defined rule.

16. The method of claim 12, wherein each entry in the index includes at least a key associated with the requested data.

17. The method of claim 12, further comprising writing the modified data is written to the storage system.

* * * * *